United States Patent
Zhao et al.

(10) Patent No.: US 8,717,410 B2
(45) Date of Patent: May 6, 2014

(54) VIDEO COMMUNICATION METHOD, APPARATUS, AND SYSTEM

(75) Inventors: Guangyao Zhao, Shenzhen (CN); Jing Wang, Shenzhen (CN); Yuan Liu, Shenzhen (CN); Jinyong Ma, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 264 days.

(21) Appl. No.: 13/355,019

(22) Filed: Jan. 20, 2012

(65) Prior Publication Data

US 2012/0120185 A1 May 17, 2012

Related U.S. Application Data

(63) Continuation of application No. PCT/CN2009/072984, filed on Jul. 29, 2009.

(51) Int. Cl.
*H04N 7/14* (2006.01)

(52) U.S. Cl.
USPC ........................................ 348/14.09; 382/284

(58) Field of Classification Search
USPC ................. 348/14.08, 14.09; 345/8; 359/23
See application file for complete search history.

(56) References Cited

U.S. PATENT DOCUMENTS

| | | | |
|---|---|---|---|
| 6,215,461 B1 * | 4/2001 | Ishibashi et al. | 345/8 |
| 6,285,392 B1 | 9/2001 | Satoda et al. | |
| 6,889,120 B2 | 5/2005 | Jouppi | |
| 7,092,002 B2 | 8/2006 | Ferren et al. | |
| 7,675,539 B2 * | 3/2010 | Matsui | 348/14.08 |
| 8,218,854 B2 * | 7/2012 | Liu et al. | 382/154 |
| 2002/0071144 A1 * | 6/2002 | Baba et al. | 359/23 |
| 2008/0192109 A1 | 8/2008 | Valenzuela et al. | |
| 2009/0147070 A1 * | 6/2009 | Marathe et al. | 348/14.09 |
| 2009/0185759 A1 * | 7/2009 | Liu et al. | 382/284 |

FOREIGN PATENT DOCUMENTS

| | | |
|---|---|---|
| CN | 1809126 A | 7/2006 |
| GB | 2450345 A | 12/2008 |
| JP | 2001136501 A | 5/2001 |

OTHER PUBLICATIONS

Extended European Search Report in corresponding European Patent Application No. 09847703.7 (Apr. 17, 2012).
Written Opinion of the International Searching Authority in corresponding International Patent Application No. PCT/CN2009/072984 (May 13, 2010).
International Search Report in corresponding PCT Application No. PCT/CN2009/072984 (May 13, 2010).

* cited by examiner

*Primary Examiner* — Mohammad Islam
(74) *Attorney, Agent, or Firm* — Leydig, Voit & Mayer, Ltd.

(57) ABSTRACT

The present invention relates to the communications field and discloses a video communication method, apparatus, and system, which are invented to solve the problem that the prior art does not achieve consistent eye-to-eye video communication in a horizontal direction. The technical solutions of the present invention includes: obtaining video images of a participant from more than two different horizontal shooting angles, where a range of viewing angles of the participant is between the more than two different horizontal shooting angles; and sending the video images of the participant to a video communication remote end. The embodiments of the present invention may be applied in the video communication field.

19 Claims, 7 Drawing Sheets

VIDEO COMMUNICATION METHOD, APPARATUS, AND SYSTEM

CROSS-REFERENCE TO THE RELATED APPLICATION

This application is a continuation of International Application No. PCT/CN2009/072984, filed on Jul. 29, 2009, and entitled "VIDEO COMMUNICATION METHOD, APPARATUS, AND SYSTEM," which is incorporated herein by reference in its entirety.

FIELD OF THE INVENTION

The present invention relates to the communications field, and in particular, to a video communication method, apparatus, and system.

BACKGROUND OF THE INVENTION

In a video communication system, a video image of a participant is obtained by a camera in the direction of a display corresponding to the participant, and is sent by the camera to a display corresponding to a video communication remote end for displaying.

In the process of implementing the present invention, the following problems are found: When there are multiple participants in a video communication conference party, each participant may make a conversation with not only a remote participant displayed on a display corresponding to each participant, but also remote participants displayed on displays corresponding to other participants in the conference party. When the participant makes a conversation with remote participants displayed on the displays corresponding to other participants in the conference party, because a horizontal viewing angle of the participant is inconsistent with a horizontal shooting angle of the camera, the video communication remote end may not display a positive video image of the participant, and as a result, consistent "eye-to-eye" video communication in a horizontal direction may not be achieved.

SUMMARY OF THE INVENTION

Embodiments of the present invention provide a video communication method, apparatus, and system, which may reach an eye-to-eye video communication effect in a horizontal direction.

To achieve the foregoing objective, embodiments of the present invention adopt the following technical solution:

A video communication method includes: obtaining video images of a participant from more than two different horizontal shooting angles, where a range of viewing angles of the participant is between the more than two different horizontal shooting angles; and sending the video images of the participant to a video communication remote end.

A video communication method includes: receiving video images of a participant from a video communication remote end, where the video images are obtained by using more than two different horizontal shooting angles; obtaining positive or approximately positive video images of the participant from the video images of the participant that are obtained by using the more than two different horizontal shooting angles; and displaying the positive or approximately positive video images.

A video communication apparatus includes:
a photographing unit, configured to obtain video images of a participant from more than two different horizontal shooting angles, where a range of viewing angles of the participant is between the more than two different horizontal shooting angles; and
a first sending unit, configured to send the video images of the participant obtained by the photographing unit to a video communication remote end.

A display apparatus includes:
a first receiving unit, configured to receive video images of a participant from a video communication remote end, where the video images are obtained by using more than two different horizontal shooting angles;
a processing unit, configured to obtain positive or approximately positive video images of the participant from the video images of the participant that are obtained by using the more than two different horizontal shooting angles and received by the first receiving unit; and
a displaying unit, configured to display the positive or approximately positive video images obtained by the processing unit.

A video communication system includes:
a video communication apparatus, configured to: obtain video images of a participant through more than two cameras located in different horizontal shooting angles, obtain positive or approximately positive video images of the participant from the video images, and send the positive or approximately positive video images of the participant to a display apparatus, where a range of viewing angles of the participant is between the more than two different horizontal shooting angles; and
the display apparatus, configured to receive and display the positive or approximately positive video images of the participant that are sent by the video communication apparatus.

A video communication system includes:
a video communication apparatus, configured to: obtain video images of a participant through more than two cameras located in different horizontal shooting angles, and send the video images of the participant to a display apparatus, where a range of viewing angles of the participant is between the more than two different horizontal shooting angles; and
the display apparatus, configured to: receive the video images of the participant that are sent by the video communication apparatus, obtain positive or approximately positive video images of the participant from the video images of the participant, and display the positive or approximately positive video images of the participant.

The video communication method, apparatus, and system provided by embodiments of the present invention may obtain video images of a participant from more than two different horizontal shooting angles, obtain positive or approximately positive video images of the participant from the video images, and display the positive or approximately positive video images of the participant, which thereby reaches the eye-to-eye video communication effect in the horizontal direction, and solves the problem that the eye-to-eye video communication effect in the horizontal direction may not be reached in the prior art.

BRIEF DESCRIPTION OF THE DRAWINGS

To make the technical solution in the embodiments of the present invention or in the prior art clearer, the accompanying drawings used in the description of the embodiments of the present invention are briefly described below. The accompanying drawings illustrate only some exemplary embodiments of the present invention, and persons skilled in the art may derive other drawings from these drawings without creative efforts.

DETAILED DESCRIPTION OF THE EMBODIMENTS

The technical solution provided by the embodiments of the present invention is described below clearly and completely with reference to the accompanying drawings. The embodiments to be described herein are merely exemplary embodiments of the present invention and the present invention is not limited to such embodiments. Based on the embodiments of the present invention, persons skilled in the art may derive other embodiments without creative efforts and such other embodiments all fall within the protective scope of the present invention.

To solve the problem that the eye-to-eye video communication effect in the horizontal direction may not be reached in the prior art, embodiments of the present invention provide a video communication method, apparatus, and system.

Figure 1:
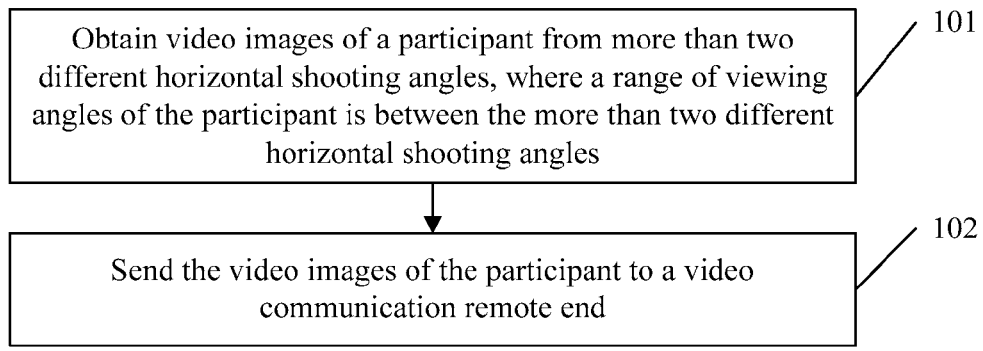
FIG. 1 is a flowchart of a video communication method according to an embodiment of the present invention.

As shown in FIG. 1, an embodiment of the present invention provides a video communication method, including the following steps:

Step 101: Obtain video images of a participant from more than two different horizontal shooting angles, where a range of viewing angles of the participant is between the more than two different horizontal shooting angles.

In this embodiment, step 101 may be as follows: More than two cameras located in different horizontal angles may shoot the same participant to obtain the video images of the participant.

Further, when there are more than two participants in the video communication conference party, the cameras may be single-lens wide-angle cameras, or may be multi-lens cameras with more than two lenses, where each lens of the multi-lens cameras may shoot one or multiple participants.

Step 102: Send the video images of the participant obtained in step 101 to a video communication remote end.

In this embodiment, step 102 may be as follows: Send the video images of the participant obtained in step 101 to the video communication remote end in multiple modes. For example, an H.264 video encoder may be used to encode video images of the participant, and the encoded video images are transmitted to the video communication remote end through an IP network, or the video images of the participant are transmitted to the video communication remote end through a radio communication network. Details are not described here.

Optionally, in this embodiment, after step 101 and before step 102, the following step may be included: Obtain positive or approximately positive video images of the participant from the video images of the participant that are obtained by using the more than two different horizontal shooting angles; and in this case, step 102 may be as follows: Send the positive or approximately positive video images of the participant to the video communication remote end.

Optionally, the positive or approximately positive video images of the participant may be obtained by using any one or a combination of the following methods:

1. Use a face detection technology to select the positive or approximately positive video images from the video images of the participant that are obtained by using the more than two different horizontal shooting angles.

The face detection technology is used to judge whether a shot face is positive from the perspective of symmetry according to an established face model. Other detection models may also be used, which are not limited by the embodiments of the present invention.

2. Synthesize the positive or approximately positive video images according to the video images of the participant that are obtained by using the more than two different horizontal shooting angles.

A three-dimensional video processing method in the prior art is as follows: Use a virtual viewpoint synthesis algorithm to synthesize the positive or approximately positive video images according to the video images of the participant that are obtained by using the more than two different horizontal shooting angles.

In a practical application process, the positive or approximately positive video images of the participant may be obtained by using other methods, which are not described here.

Optionally, the video communication method provided by the embodiment of the present invention may further include a step of sending indication information to the video communication remote end, where the indication information is used to instruct the video communication remote end to obtain the positive or approximately positive video images of the participant.

The video communication method provided by the embodiment of the present invention may obtain the video images of a participant from more than two different horizontal shooting angles, and send the video images to a video communication remote end, so that the video communication remote end may display the positive or approximately positive video images according to the video images, which therefore reaches the eye-to-eye video communication effect in the horizontal direction.

Figure 2:
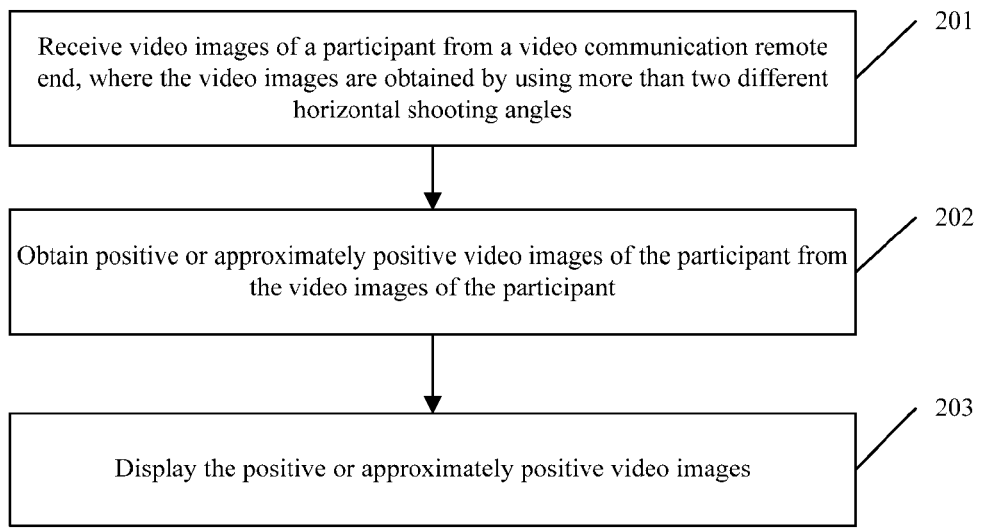
FIG. 2 is a flowchart of a video communication method according to another embodiment of the present invention.

As shown in FIG. 2, another embodiment of the present invention also provides a video communication method, including the following steps:

Step 201: Receive video images of a participant from a video communication remote end, where the video images are obtained by using more than two different horizontal shooting angles.

Step 202: Obtain positive or approximately positive video images of the participant from the video images of the participant obtained in step 201.

In this embodiment, the positive or approximately positive video images of the participant may be obtained by using any one or a combination of the following methods:

1. Use a face detection technology to select the positive or approximately positive video images from the video images of the participant that are obtained by using the more than two different horizontal shooting angles.

2. Synthesize the positive or approximately positive video images according to the video images of the participant that are obtained by using the more than two different horizontal shooting angles.

In a practical application process, the positive or approximately positive video images of the participant may be obtained by using other methods, which are not described here.

Step 203: Display the positive or approximately positive video images obtained in step 202.

In this embodiment, step 203 may be as follows: Display the positive or approximately positive video images through an ordinary display (a single-view display) or display the positive or approximately positive video images through a multi-view display.

Optionally, when the video images of the participant include positive or approximately positive video images, in which the video images of the participant are received from the video communication remote end in step 201 and are obtained by using the more than two different horizontal shooting angles, step 202 may be skipped; in this case, step 203 may display, through a multi-view display, all the video images obtained in step 201.

Optionally, before step 202, a step of receiving indication information from the video communication remote end may be included; in this case, step 202 may be as follows: According to the indication information, obtain positive or approximately positive video images of the participant from the video images obtained in step 201.

The video communication method provided by the embodiment of the present invention may receive the video images of a participant from a video communication remote end, where the video images are obtained by using more than two different horizontal shooting angles, obtain positive or approximately positive video images from the video images, and display the positive or approximately positive video images, which therefore reaches the eye-to-eye video communication effect in the horizontal direction.

To help those skilled in the art better understand the technical solution provided by the embodiments of the present invention, the video communication method is described in detail with reference to specific embodiments of the present invention.

Figure 3:
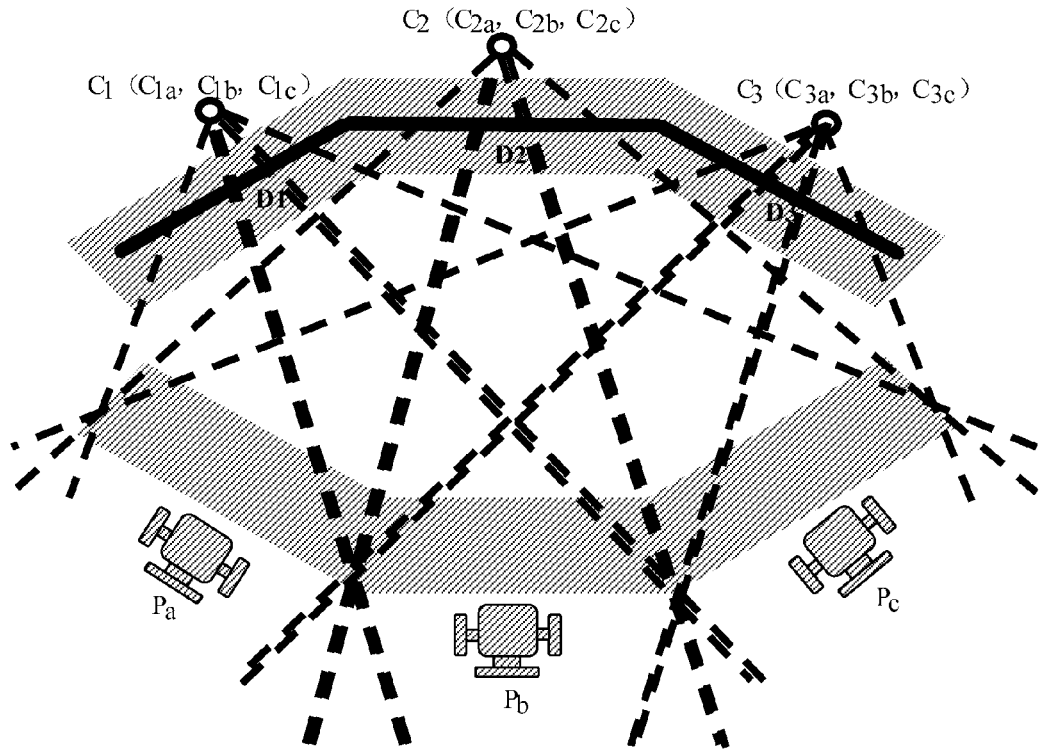
FIG. 3 is an architecture diagram of a video communication system according to still another embodiment of the present invention.

In still another embodiment of the present invention, as shown in FIG. 3, there are three participants Pa, Pb, and Pc in a video communication conference party. Pa has only three viewing angles Pa1, Pa2 and Pa3 (not illustrated in FIG. 3). Pb has only three viewing angles Pb1, Pb2, and Pb3 (not illustrated in FIG. 3). Pc has only three viewing angles Pc1, Pc2, and Pc3 (not illustrated in FIG. 3). Three triple-lens cameras C1 (C1a, C1b, and C1c), C2 (C2a, C2b, and C2c), and C3 (C3a, C3b, and C3c) are set in the viewing angles of Pa, Pb, and Pc. C1a, C1b, and C1c are the three lenses of $C_1$, where $C_{1a}$ corresponds to $P_{a1}$, $C_{1b}$ corresponds to $P_{b1}$, and $C_{1c}$ corresponds to $P_{c1}$. $C_{2a}$, $C_{2b}$, and $C_{2c}$ are the three lenses of $C_2$, where $C_{2a}$ corresponds to $P_{a2}$, $C_{2b}$ corresponds to $P_{b2}$, and $C_{2c}$ corresponds to $P_{c2}$. $C_{3a}$, $C_{3b}$, and $C_{3c}$ are the three lenses of $C_3$, where $C_{3a}$ corresponds to $P_{a3}$, $C_{3b}$ corresponds to $P_{b3}$, and $C_{3c}$ corresponds to $P_{c3}$. Three triple-view displays $D_1$ ($V_{1a}$, $V_{1b}$, and $V_{1c}$), $D_2$ ($V_{2a}$, $V_{2b}$, and $V_{2c}$), and $D_3$ ($V_{3a}$, $V_{3b}$, and $V_{ac}$) are set at the video communication remote end. $V_{1a}$, $V_{1b}$, and $V_{1c}$ (not illustrated in FIG. 3) are the three viewing angles of $D_1$. $V_{2a}$, $V_{2b}$, and $V_{2c}$ (not illustrated in FIG. 3) are the three viewing angles of $D_2$. $V_{3a}$, $V_{3b}$, and $V_{3c}$ (not illustrated in FIG. 3) are the three viewing angles of $D_3$.

Figure 4:
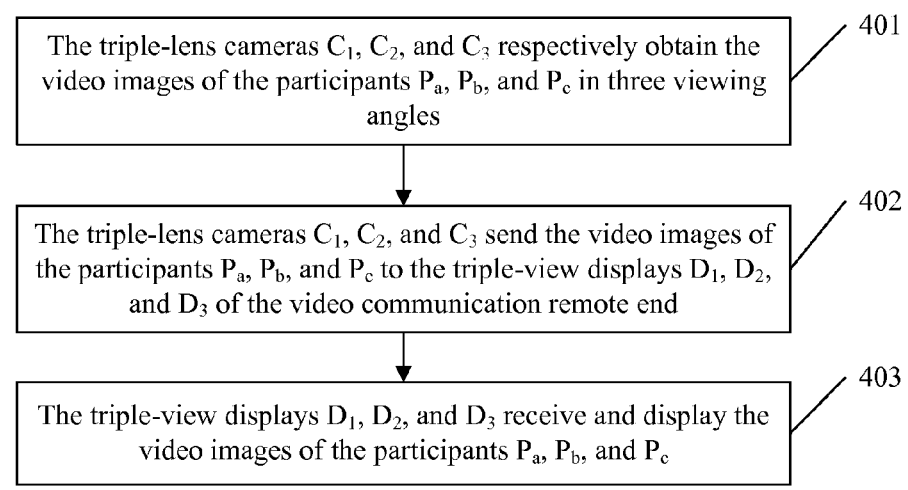
FIG. 4 is a flowchart of a video communication method according to still another embodiment of the present invention on the basis of FIG. 3.

As shown in FIG. 4, on the basis of the architecture of the video communication system shown in FIG. 3, still another embodiment of the present invention provides a video communication method, including the following steps:

Step 401: The triple-lens cameras $C_1$, $C_2$, and $C_3$ respectively obtain the video images of the participants $P_a$, $P_b$, and $P_c$ in three shooting angles.

Specifically, as shown in FIG. 3, $C_{1a}$, $C_{2a}$, and $C_{3a}$ are used to shoot $P_a$ and obtain the video images of $P_a$ from $P_{a1}$, $P_{a2}$, and $P_{a3}$ respectively; $C_{1b}$, $C_{2b}$, and $C_{3b}$ are used to shoot $P_b$ and obtain the video images of $P_b$ from $P_{b1}$, $P_{b2}$, and $P_{b3}$ respectively; $C_{1c}$, $C_{2c}$, and $C_{3c}$ are used to shoot $P_c$ and obtain the video images of $P_c$ from $P_{c1}$, $P_{c2}$, and $P_{c3}$ respectively.

Step 402: The triple-lens cameras $C_1$, $C_2$, and $C_3$ send the video images of the participants $P_a$, $P_b$, and $P_c$ that are obtained in step 401 to the triple-view displays $D_1$, $D_2$, and $D_3$ of the video communication remote end.

In this embodiment, the triple-lens cameras $C_1$, $C_2$, and C3 may send the video images of the participants $P_a$, $P_b$, and $P_c$ to the triple-view displays $D_1$, $D_2$, and $D_3$ of the video communication remote end through an IP network. Specifically, the triple-lens cameras $C_1$, $C_2$, and C3 respectively use an H.264 video encoder to encode the video images obtained by each lens and send the encoded video images to the triple-view displays $D_1$, $D_2$, and $D_3$ of the video communication remote end through an IP network.

In a practical application process, the video images of the participants $P_a$, $P_b$, and $P_c$ may also be sent to the triple-view displays $D_1$, $D_2$, and $D_3$ of the video communication remote end in other modes, for example, through a radio communication network, which are not described here.

Step 403: The triple-view displays $D_1$, $D_2$, and $D_3$ receive and display the video images of the participants $P_a$, $P_b$, and $P_c$ that are sent in step 402.

In this embodiment, the triple-view displays $D_1$, $D_2$, and $D_3$ may receive, through an IP network, the video images of the participants $P_a$, $P_b$, and $P_c$ that are sent in step 402, use an H.264 video decoder to decode the received video images, and obtain and display the decoded video images; or the triple-view displays $D_1$, $D_2$, and $D_3$ may receive the video images of the participants $P_a$, $P_b$, and $P_c$ that are sent in step 402 in other modes, which are not described here.

In this embodiment, the triple-view displays $D_1$, $D_2$, and $D_3$ may display the video images of the participants $P_a$, $P_b$, and $P_c$ in a single-participant full-screen display mode. Specifically, the following steps are included:

1. Establish mapping relationships between the triple-view displays $D_1$, $D_2$, and $D_3$ and the triple-lens cameras $C_1$, $C_2$, and $C_3$. For example, an established mapping relationship between the triple-view display $D_1$ and the triple-lens camera C1 may be as follows: $V_{1a}$ corresponds to $C_{1a}$, $V_{1b}$ corresponds to $C_{1b}$, and $V_{1c}$ corresponds to $C_{1a}$; an established mapping relationship between the triple-view display $D_2$ and the triple-lens camera C2 may be as follows: $V_{2a}$ corresponds to $C_{2a}$, $V_{2b}$ corresponds to $C_{2b}$, and $V_2$ corresponds to $C_{2c}$; the established mapping relationship between the triple-view display $D_3$ and the triple-lens camera $C_3$ may be as follows: $V_{1a}$ corresponds to $C_{3a}$, $V_{3b}$ corresponds to $C_{3b}$, and $V_{3c}$ corresponds to $C_{3c}$.

2. According to the mapping relationships between the triple-view displays $D_1$, $D_2$, and $D_3$ and the triple-lens cameras $C_1$, $C_2$, and $C_3$, display the video images of the participants $P_a$, $P_b$, and $P_c$ that are sent in step 302 on the triple-view displays $D_1$, $D_2$, and $D_3$ respectively.

Figure 5:
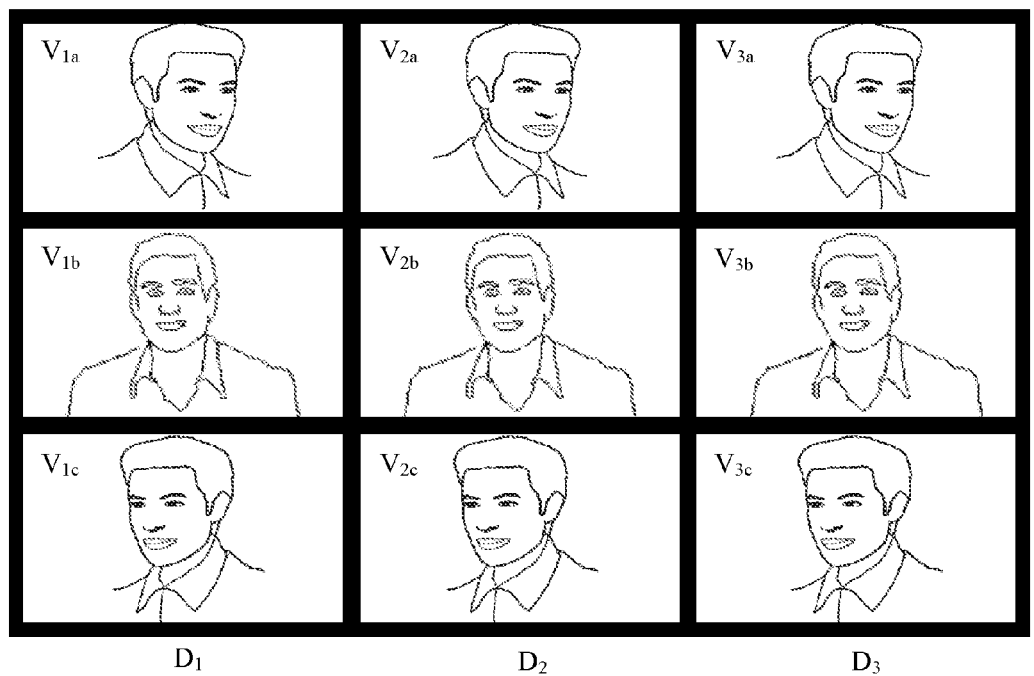
FIG. 5 is a schematic diagram of video images displayed on triple-view displays $D_1$, $D_2$, and $D_3$ in the video communication method shown in FIG. 4 according to still another embodiment of the present invention.

For example, it is assumed that the mapping relationships between the triple-view displays $D_1$, $D_2$, and $D_3$ and the triple-lens cameras $C_1$, $C_2$, and $C_3$ are as follows: $D_1$ corresponds to $C_1$, where $V_{1a}$ corresponds to $C_{1a}$, $V_{1b}$ corresponds to $C_{1b}$, and $V_{1c}$ corresponds to $C_{1c}$; $D_2$ corresponds to $C_2$, where $V_{2a}$ corresponds to $C_{2a}$, $V_{2b}$ corresponds to $C_{2b}$, and $V_{2c}$ corresponds to $C_{2c}$; $D_3$ corresponds to $C_3$, where $V_{3a}$ corresponds to $C_{3a}$, $V_{3b}$ corresponds to $C_{3b}$, and $V_3$ corresponds to $C_{3c}$. In this case, on the triple-view display $D_1$, the viewing angle $V_{1a}$ displays the video images of the participant $P_a$ in $P_{a1}$ in the single-participant full-screen display mode, the viewing angle $V_{1b}$ displays the video images of the participant $P_b$ in $P_{b1}$ in the single-participant full-screen display mode, and the viewing angle $V_{1c}$ displays the video images of the participant $P_c$ in $P_{c1}$ in the single-participant full-screen display mode; by analogy, the three viewing angles $V_{2a}$, $V_{2b}$, and $V_{2c}$ of the triple-view display $D_2$ respectively display, in the single-participant full-screen display mode, the video images of the participant $P_a$ in $P_{a2}$, the video images of the participant $P_b$ in $P_{b2}$, and the video images of the participant $P_c$ in $P_{c2}$, and the three viewing angles $V_{3a}$, $V_{3b}$, and $V_{3c}$ of the triple-view display $D_3$ respectively display, in the single-participant full-screen display mode, the video images of the participant $P_a$ in $P_{a3}$, the video images of the participant $P_b$ in $P_{b3}$, and the video images of the participant $P_c$ in $P_{c3}$. Specifically, when the participants $P_a$, $P_b$, and $P_c$ all look at the triple-lens camera $C_2$, the video images displayed on the triple-view displays $D_1$, $D_2$, and $D_3$ are as shown in FIG. 5.

The video communication method provided by the embodiment of the present invention may obtain the video images of participants in each viewing angle through multiple cameras and transmit the video images to a multi-view display at the video communication remote end for displaying, so that the multi-view display at the video communication remote end may display the positive video images of the participants regardless of the viewing angles that the participants look at which thereby achieves the purpose of the eye-to-eye video communication in the horizontal direction, and solves the problem that the eye-to-eye video communication effect in the horizontal direction may not be reached in the prior art.

Figure 6:
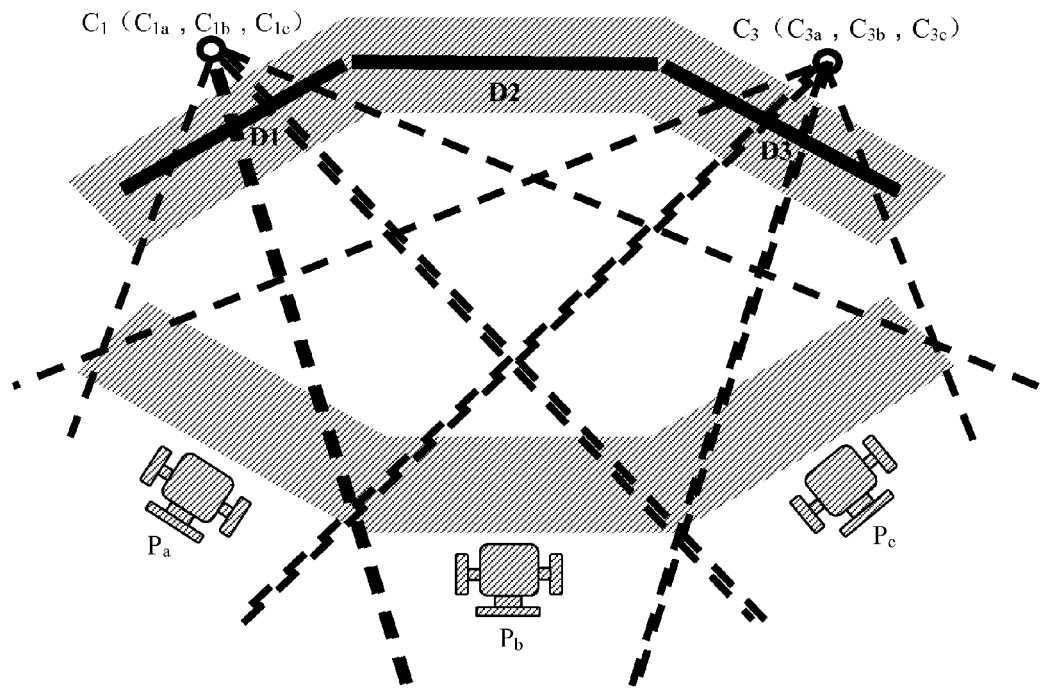
FIG. 6 is an architecture diagram of a video communication system according to still another embodiment of the present invention.

In still another embodiment of the present invention, as shown in FIG. 6, there are three participants $P_a$, $P_b$, and $P_c$ in a video communication conference party. $P_a$ has only three viewing angles $P_{a1}$, $P_{a2}$ and $P_{a3}$ (not illustrated in FIG. 6). $P_b$ has only three viewing angles $P_{b1}$, $P_{b2}$, and $P_{b3}$ (not illustrated in FIG. 6). $P_c$ has only three viewing angles $P_{c1}$, $P_{c2}$, and $P_{c3}$ (not illustrated in FIG. 6). Two triple-lens cameras $C_1$ ($C_{1a}$, $C_{1b}$, and $C_{1c}$) and $C_3$ ($C_{3a}$, $C_{3b}$, and $C_{3c}$) are set in the viewing angles of $P_a$, $P_b$, and $P_c$. $C_{1a}$, $C_{1b}$, and $C_{1c}$ are the three lenses of $C_1$, where $C_{1a}$ corresponds to $P_{a1}$, $C_{1b}$ corresponds to $P_{b1}$, and $C_{1c}$ corresponds to $P_{c1}$. $C_{3a}$, $C_{3b}$, and $C_{3c}$ are the three lenses of $C_3$, where $C_{3a}$ corresponds to $P_{a3}$, $C_{3b}$ corresponds to $P_{b3}$, and $C_{3c}$ corresponds to $P_{c3}$. Three triple-view displays $D_1$ ($V_{1a}$, $V_{1b}$, and $V_{1c}$), $D_2$ ($V_{2a}$, $V_{2b}$, and $V_{2c}$), and $D_3$ ($V_{3a}$, $V_{3b}$, and $V_{3c}$) are set at the video communication remote end. $V_{1a}$, $V_{1b}$, and $V_{1c}$ (not illustrated in FIG. 6) are the three viewing angles of $D_1$. $V_{2a}$, $V_{2b}$, and $V_{2c}$ (not illustrated in FIG. 6) are the three viewing angles of $D_2$. $V_{3a}$, $V_{3b}$, and $V_{3c}$ (not illustrated in FIG. 6) are the three viewing angles of $D_3$.

Figure 7:
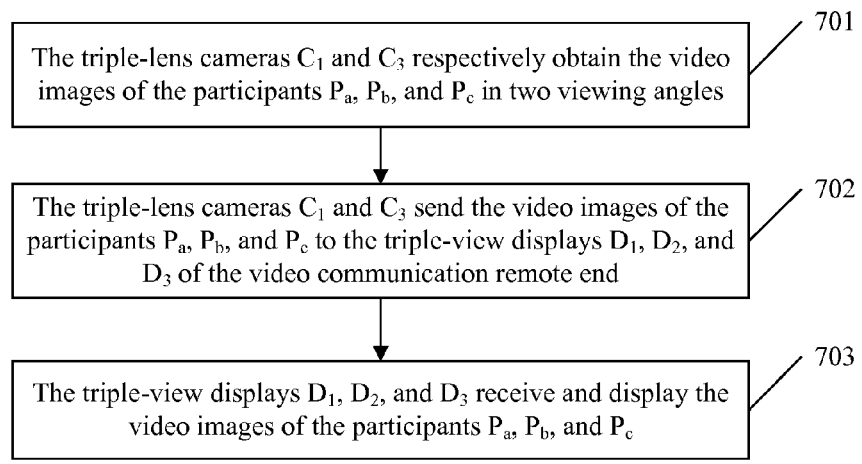
FIG. 7 is a flowchart of a video communication method according to still another embodiment of the present invention on the basis of FIG. 6.

As shown in FIG. 7, on the basis of the architecture of the video communication system shown in FIG. 6, still another embodiment of the present invention provides a video communication method, including the following steps:

Step 701: The triple-lens cameras $C_1$ and $C_3$ respectively obtain the video images of the participants $P_a$, $P_b$, and $P_c$ in two shooting angles.

Specifically, as shown in FIG. 6, $C_{1a}$ and $C_{3a}$ are used to shoot $P_a$ and obtain the video images of $P_a$ from $P_{a1}$ and $P_{a3}$ respectively; $C_{1b}$ and $C_{3b}$ are used to shoot $P_b$ and obtain the video images of $P_b$ from $P_{b1}$ and $P_{b3}$ respectively; $C_{1c}$ and $C_{3c}$ are used to shoot $P_c$ and obtain the video images of $P_c$ from $P_{c1}$ and $P_{c3}$ respectively.

Step 702: The triple-lens cameras $C_1$ and $C_3$ send the video images of the participants $P_a$, $P_b$, and $P_c$ that are obtained in step 701 to the triple-view displays $D_1$, $D_2$, and $D_3$ of the video communication remote end. The specific method is described in step 402 shown in FIG. 4 and not described here again.

Step 703: The triple-view displays $D_1$, $D_2$, and $D_3$ receive and display the video images of the participants $P_a$, $P_b$, and $P_c$ that are sent in step 702. The specific method for the triple-view displays $D_1$, $D_2$, and $D_3$ to receive the video images of the participants $P_a$, $P_b$, and $P_c$ is described in step 403 shown in FIG. 4 and not described here again.

In this embodiment, the triple-view displays $D_1$, $D_2$, and $D_3$ may display the video images of the participants $P_a$, $P_b$, and $P_c$ in the single-participant full-screen display mode. Specifically, the following steps are included:

1. Select two target displays from the triple-view displays $D_1$, $D_2$, and $D_3$, and establish mapping relationships between the target displays and the triple-lens cameras $C_1$ and $C_3$. For example, the triple-view displays $D_1$ and $D_3$ are selected as target displays; an established mapping relationship between the triple-view display $D_1$ and the triple-lens camera $C_1$ is as follows: $V_{1a}$ corresponds to $C_{1a}$, $V_{1b}$ corresponds to $C_{1b}$, and $V_{1c}$ corresponds to $C_{1c}$; an established mapping relationship between the triple-view display $D_3$ and the triple-lens camera $C_3$ is as follows: $V_{3a}$ corresponds to $C_{3a}$, $V_{3b}$ corresponds to $C_{3b}$, and $V_{3c}$ corresponds to $C_{3c}$.

2. According to the mapping relationships between the target displays and the triple-lens cameras $C_1$ and $C_3$, display the video images of the participants $P_a$, $P_b$, and $P_c$ that are sent by the triple-lens cameras $C_1$ and $C_3$ on the target displays respectively.

For example, it is assumed that the target displays are the triple-view displays $D_1$ and $D_3$, and that the mapping relationships between the target displays and the triple-lens cameras $C_1$ and $C_3$ are as follows: $D_1$ corresponds to $C_1$, where $V_{1a}$ corresponds to $C_{1a}$, $V_{1b}$ corresponds to $C_{1b}$, and $V_{1c}$ corresponds to $C_{1c}$; $D_3$ corresponds to $C_3$, where $V_{3a}$ corresponds to $C_{3a}$, $V_{3b}$ corresponds to $C_{3b}$, and $V_{3c}$ corresponds to $C_{3c}$. In this case, on the triple-view display $D_1$, the viewing angle $V_{1a}$ displays the video images of the participant $P_a$ in $P_{a1}$ in the single-participant full-screen display mode, the viewing angle $V_{1b}$ displays the video images of the participant $P_b$ in $P_{b1}$ in the single-participant full-screen display mode, and the viewing angle $V_{1c}$ displays the video images of the participant $P_c$ in $P_{c1}$ in the single-participant full-screen display mode; by analogy, the three viewing angles $V_{3a}$, $V_{3b}$, and $V_{3c}$ of the triple-view display $D_3$ respectively display, in the single-participant full-screen display mode, the video images of the participant $P_a$ in $P_{a3}$, the video images of the participant $P_b$ in $P_{b3}$, and the video images of the participant $P_c$ in $P_{c3}$.

3. According to the video images of the participants $P_a$, $P_b$, and $P_c$ that are sent by the triple-lens cameras $C_1$ and $C_3$, synthesize the video images of the participants $P_a$, $P_b$, and $P_c$ to be displayed on a non-target display (in this embodiment, the non-target display is a triple-view display $D_2$), that is, synthesize the video images of $P_a$ in $P_{a2}$, the video images of $P_b$ in $P_{b2}$, and the video images of $P_c$ in $P_{c2}$.

The following describes how to synthesize the video images of $P_a$ in $P_{a2}$ according to the video images of the participant $P_a$ that are sent by the triple-lens cameras $C_1$ and $C_3$.

In this embodiment, the synthesizing the video images of $P_a$ in $P_{a2}$ according to the video images of the participant $P_a$ that are sent by the triple-lens cameras $C_1$ and $C_3$ may include: first, obtaining information about disparity between images of the participant $P_a$ in $P_{a1}$ and $P_{a3}$ according to the video images of the participant $P_a$ in $P_{a1}$ that are sent by the triple-lens camera $C_1$ through $C_{1a}$ and the video images of the participant $P_a$ in $P_{a3}$ that are sent by the triple-lens camera $C_3$ through $C_{3a}$; and then using a virtual viewpoint synthesis algorithm to synthesize the video images of $P_a$ in $P_{a2}$ according to the disparity information and the video images of $P_a$ in $P_{a1}$ and $P_{a3}$.

The basic steps of virtual viewpoint synthesis may include: disparity mapping (including integral disparity mapping and fractional disparity mapping), based on which the images of virtual viewpoint positions are generated; shadow or hole processing, which may process a shadow area according to a certain rule, and fill a hole caused by an area of discontinuous depth, for example, fill a small hole by linear or quadratic interpolation, and fill a big hole by using an image obtained from another viewing angle or by using a background; post-processing, which filters reconstructed images to improve a subjective effect.

In the disparity mapping, a disparity relationship between a middle viewpoint and a left viewpoint or between a middle viewpoint and a right viewpoint is as follows:

$$d_{LR} = X_R - X_L = -\frac{BF}{z}$$

$$d_{Li} = X_i - X_L = -\frac{xF}{z} = \left(\frac{x}{B}\right)d_{LR} = \alpha d_{LR}$$

$$X_i = (1-\alpha)X_L + \alpha X_R = X_L + \alpha d_{LR}$$

where, $X_L$ and $X_R$ are respectively the positions of a point in the space in the X direction for imaging on left and right images, and $X_i$ is a position of a middle virtual viewpoint in the X direction for imaging; B is an optical center distance of a camera, F is a focal distance of the camera, and z is a distance from the point to an imaging plane; $d_{LR}$ is the disparity between a left image and a right image, and $\alpha$ is a weight related to a distance between an optical center of a virtual camera and an optical center of a left camera or between an optical center of a virtual camera and a right camera.

The color of a middle viewpoint image is usually determined according to corresponding points in the left and right viewpoint images:

$$I_i(X_i,Y) = (1-\alpha)I_L(X_L,Y) + \alpha I_R(X_R,Y)$$

where, $I_L(X_L,Y)$ and $I_R(X_R,Y)$ are respectively pixel color values of a point for imaging on the left and right images, and $I_i(X_i,Y)$ is a pixel color value of the middle virtual viewpoint for imaging.

The method for synthesizing the video images of $P_b$ in $P_{b2}$ and synthesizing the video images of $P_c$ in $P_{c2}$ is the same as above and therefore is not described here again.

In this embodiment, the mapping relationships between the viewing angles of a non-target display and the video images to be displayed may be established in advance. For example, when the non-target display is a triple-view display $D_2$, a mapping relationship may be established between $V_{2a}$ and the video images of $P_a$ to be displayed in $P_{a2}$, a mapping relationship may be established between $V_{2b}$ and the video images of $P_b$ to be displayed in $P_{b2}$, and a mapping relationship may be established between $V_2$ and the video images of $P_c$ to be displayed in $P_{c2}$; then the video images of the participants are displayed in corresponding viewing angles of the displays according to the mapping relationships.

Optionally, in this embodiment, step 702 may be as follows: Send indication information to the video communication remote end, where the indication information may be information about the viewing angles $P_{a2}$, $P_{b2}$, and $P_{c2}$. In this case, in step 703, the multi-view displays $D_1$, $D_2$, and $D_3$ may synthesize the video images of $P_a$ in $P_{a2}$, the video images of $P_b$ in $P_{b2}$, and the video images of $P_c$ in $P_{c2}$ according to the indication information and the video images of the participants $P_a$, $P_b$, and $P_c$ that are received in step 702.

The video communication method provided by the embodiment of the present invention may obtain the video images of participants in multiple viewing angles through multiple cameras and transmit the video images to the video communication remote end, and the video communication remote end synthesizes and displays the video images of the participants in each viewing angle, so that the multi-view display at the video communication remote end may display the positive video images of the participants regardless of the viewing angles that the participants look at which thereby achieves the purpose of the eye-to-eye video communication in the horizontal direction, and solves the problem that the eye-to-eye video communication effect in the horizontal direction may not be reached in the prior art.

In still another embodiment of the present invention, the architecture of a video communication system is basically the same as that shown in FIG. 3, except a difference that three ordinary displays $D_1'$, $D_2'$, and $D_3'$ (with only one viewing angle) are set at the video communication remote end.

Figure 8:
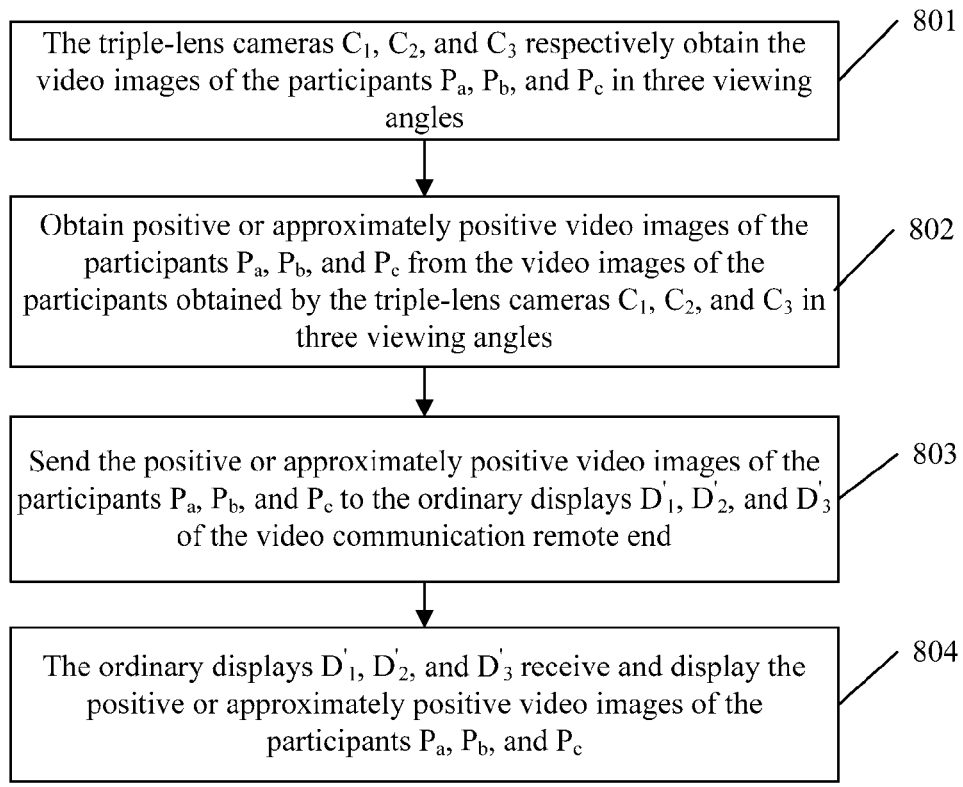
FIG. 8 is a flowchart of a video communication method according to still another embodiment of the present invention.

As shown in FIG. 8, on the basis of the architecture of the video communication system provided in the embodiment of the present invention, this embodiment provides a video communication method, including the following steps:

Step 801: The triple-lens cameras $C_1$, $C_2$, and $C_3$ respectively obtain the video images of the participants $P_a$, $P_b$, and $P_c$ in three shooting angles. The specific method is described in step 401 shown in FIG. 4 and not described here again.

Step 802: Obtain positive or approximately positive video images of the participants $P_a$, $P_b$, and $P_c$ from the video images of the participants obtained by the triple-lens cameras $C_1$, $C_2$, and $C_3$ in three shooting angles.

In this embodiment, step 802 may be as follows: Obtain the positive or approximately positive video images of the participants $P_a$, $P_b$, and $P_c$ by using two methods.

One method is to use a face detection technology to select the positive or approximately positive video images of the participants $P_a$, $P_b$, and $P_c$ from the video images of the participants $P_a$, $P_b$, and $P_c$.

The following describes how to use the face detection technology to select the positive or approximately positive video images of the participant $P_a$ from the video images of the participant $P_a$.

In this embodiment, using the face detection technology to select the positive or approximately positive video images of the participants $P_a$ from the video images of the participant $P_a$ may include: first, detecting positions such as a face range, eyes, a nose, and a mouth of the participant $P_a$ in the video images in each viewing angle ($P_{a1}$, $P_{a2}$, and $P_{a3}$); then determining the angle of deflection of the video images in each viewing angle ($P_{a1}$, $P_{a2}$, and $P_{a3}$) relative to a positive image according to the degree of symmetry of the eyes and face range relative to the nose and mouth; and finally selecting the positive or approximately positive video images from the video images in each viewing angle ($P_{a1}$, $P_{a2}$, and $P_{a3}$) according to the angle of deflection.

The method of using the face detection technology to select the positive or approximately positive video images of the participants $P_b$ and $P_c$ from the video images of the participants $P_b$ and $P_c$ is the same as above and therefore is not described here again.

The other method is to synthesize the positive or approximately positive video images of the participants $P_a$, $P_b$, and $P_c$ according to the video images of the participants $P_a$, $P_b$, and $P_c$. The specific method is described in step 703 shown in FIG. 7 and not described here again.

Step 803: Send the positive or approximately positive video images of the participants $P_a$, $P_b$, and $P_c$ obtained in step 802 to the ordinary displays $D'_1$, $D'_2$, and $D'_3$ of the video communication remote end. The specific method is described in step 402 shown in FIG. 4 and not described here again.

Step 804: The ordinary displays $D_1'$, $D_2'$ and $D_3'$ receive and display the positive or approximately positive video images of the participants $P_a$, $P_b$, and $P_c$ that are sent in step 803.

In this embodiment, the ordinary displays $D_1'$, $D_2'$ and $D_3'$ may display the positive or approximately positive video images of the participants $P_a$, $P_b$, and $P_c$ according to a user's instruction or a pre-defined display mode. The display mode may include: displaying the positive or approximately positive video images of the participants $P_a$, $P_b$, and $P_c$ in the single-participant full-screen display mode; or displaying the positive or approximately positive video images of the participants $P_a$, $P_b$, and $P_c$ in a multi-participant display mode.

Optionally, when any one or multiple of the ordinary displays $D_1'$, $D_2'$, and $D_3'$ use the multi-participant display mode to display the positive or approximately positive video images of the participants $P_a$, $P_b$, and $P_c$, the video communication method provided by the embodiment of the present invention may further include: obtaining display indication information; and according to the display indication information, switching from the multi-participant display mode to the single-participant full-screen display mode, and displaying the positive or approximately positive video images of a participant indicated in the display indication information.

The video communication method provided by the embodiment of the present invention may obtain the video images of participants in each viewing angle through multiple cameras, select positive or approximately positive video images, and transmit the positive or approximately positive video images to a display at the video communication remote end for displaying, which thereby achieves the purpose of the eye-to-eye video communication in the horizontal direction, and solves the problem that the eye-to-eye video communication effect in the horizontal direction may not be reached in the prior art.

In still another embodiment of the present invention, the architecture of a video communication system is basically the same as that shown in FIG. 3, except a difference that three ordinary displays $D_1'$, $D_2'$, and $D_3'$ (displays with only one viewing angle) are set at the video communication remote end.

Figure 9:
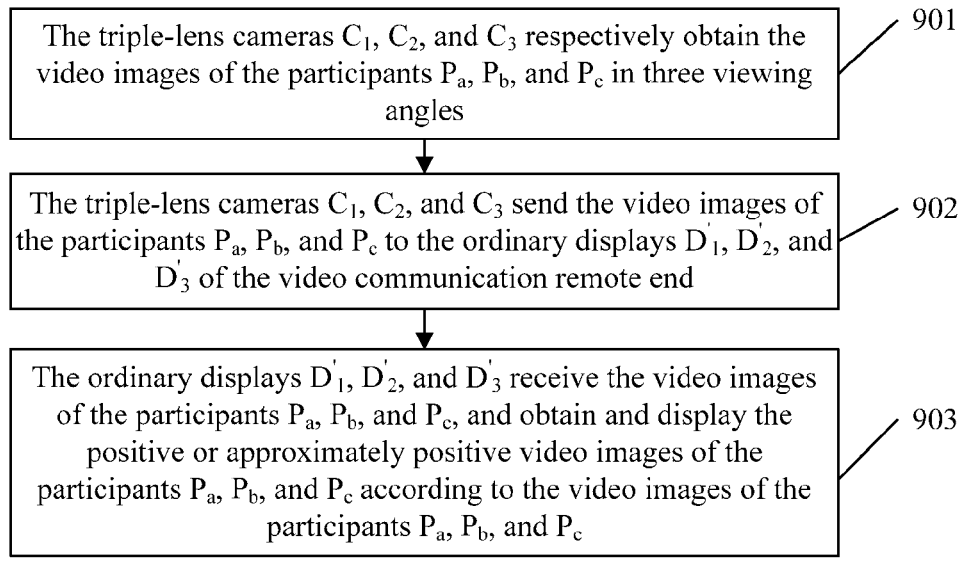
FIG. 9 is a flowchart of a video communication method according to still another embodiment of the present invention.

As shown in FIG. 9, on the basis of the architecture of the video communication system provided in the embodiment of the present invention, this embodiment provides a video communication method, including the following steps:

Step 901: The triple-lens cameras $C_1$, $C_2$, and $C_3$ respectively obtain the video images of the participants $P_a$, $P_b$, and $P_c$ in three shooting angles. The specific method is described in step 401 shown in FIG. 4 and not described here again.

Step 902: The triple-lens cameras $C_1$, $C_2$, and $C_3$ send the video images of the participants $P_a$, $P_b$, and $P_c$ that are obtained in step 901 to the ordinary displays $D_1'$, $D_2'$, and $D_3'$ of the video communication remote end. The specific method is described in step 402 shown in FIG. 4 and not described here again.

Step 903: The ordinary displays $D_1'$, $D_2'$, and $D_3'$ receive the video images of the participants $P_a$, $P_b$, and $P_c$ that are sent in step 902, and obtain and display the positive or approximately positive video images of the participants $P_a$, $P_b$, and $P_c$ according to the video images of the participants $P_a$, $P_b$, and $P_c$. The specific method for the ordinary displays $D_1'$, $D_2'$, and $D_3'$ to receive the video images of the participants $P_a$, $P_b$, and $P_c$ is described in step 403 shown in FIG. 4 and not described here again.

In this embodiment, two methods may be used to obtain the positive or approximately positive video images of the participants $P_a$, $P_b$, and $P_c$ according to the video images of the participants $P_a$, $P_b$, and $P_c$. The specific methods are described in step 802 shown in FIG. 8 and not described here again.

In this embodiment, the ordinary displays $D_1'$, $D_2'$, and $D_3'$ may display the positive or approximately positive video images of the participants $P_a$, $P_b$, and $P_c$ according to a user's instruction or a pre-defined display mode. The display mode may include: displaying the positive or approximately positive video images of the participants $P_a$, $P_b$, and $P_c$ in the single-participant full-screen display mode; or displaying the positive or approximately positive video images of the participants $P_a$, $P_b$, and $P_c$ in the multi-participant display mode.

Optionally, when any one or multiple of the ordinary displays $D_1$, $D_2'$, and $D_3'$ use the multi-participant display mode to display the positive or approximately positive video images of the participants $P_a$, $P_b$, and $P_c$, the video communication method provided by the embodiment of the present invention may further include: obtaining display indication information; and according to the display indication information, switching from the multi-participant display mode to the single-participant full-screen display mode, and displaying the positive or approximately positive video images of a participant indicated in the display indication information.

Optionally, in this embodiment, step 902 may further send indication information to the video communication remote end, where the indication information may be angle information required for synthesizing the positive or approximately positive video images of the participants $P_a$, $P_b$, and $P_c$, or be error range information of the approximately positive video images. In this case, step 903 may be as follows: Select or synthesize the positive or approximately positive video images of the participants $P_a$, $P_b$, and $P_c$ according to the indication information and the video images of the participants $P_a$, $P_b$, and $P_c$ that are received in step 902.

The video communication method provided by the embodiment of the present invention may obtain the video images of participants in each viewing angle through multiple cameras, and transmit the video images to a display at the video communication remote end, and the display at the video communication remote end may select or synthesize positive or approximately positive video images according to the video images and display the positive or approximately positive video images, which thereby achieves the purpose of the eye-to-eye video communication in the horizontal direction, and solves the problem that the eye-to-eye video communication effect in the horizontal direction cannot be reached in the prior art.

It should be noted that the foregoing embodiments are exemplary embodiments. In a practical application process, the number of participants in the conference party may vary, for example, may be 2, 4, or greater. The number and positions of cameras may be decided according to the number and directions of the viewing angles of the participants. The cameras may not only be multi-lens cameras but also single-lens wide-angle cameras. When the cameras are multi-lens cameras, each lens is not limited to the shooting of only one participant, and may shoot two or more participants, which is not described here.

Figure 10:
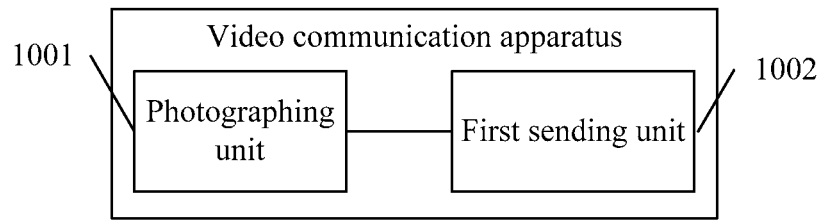
FIG. 10 is a first schematic structural diagram of a video communication apparatus according to an embodiment of the present invention.

As shown in FIG. 10, an embodiment of the present invention provides a video communication apparatus, including a photographing unit 1001 and a first sending unit 1002.

The photographing unit 1001 is configured to obtain video images of a participant from more than two different horizontal shooting angles, where the range of viewing angles of the participant is between the more than two different horizontal shooting angles.

In this embodiment, the photographing unit 1001 may include more than two cameras located in different horizontal angles, where the number and positions of the cameras may be decided according to the number and directions of the viewing angles of participants. Further, when a conference party in video communication includes more than two participants, the cameras may be single-lens wide-angle cameras, or may be multi-lens cameras with more than two lenses, where each lens of the multi-lens cameras may shoot one or more participants.

The first sending unit 1002 is configured to send the video images of the participant obtained by the photographing unit 1001 to a video communication remote end.

In this embodiment, the first sending unit 1002 may send the video images of the participant obtained by the photographing unit 1001 to the video communication remote end in multiple modes. For example, an H.264 video encoder may be used to encode video images of the participant, and the encoded video images are transmitted to the video communication remote end through an IP network, or the video images of the participant are transmitted to the video communication remote end through a radio communication network. Details are not described here.

Figure 11:
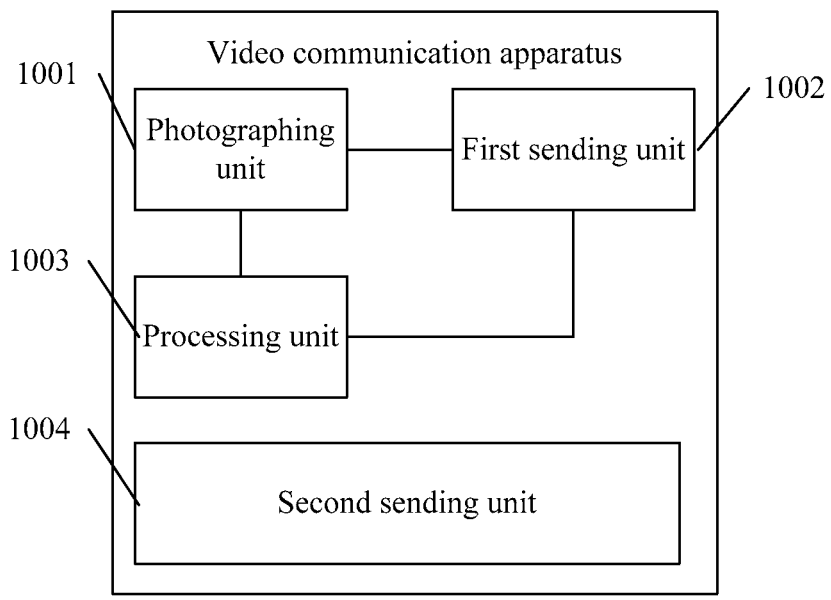
FIG. 11 is a second schematic structural diagram of a video communication apparatus according to an embodiment of the present invention.

Further, as shown in FIG. 11, the video communication apparatus provided by the embodiment of the present invention may include a processing unit 1003 configured to obtain positive or approximately positive video images of the participant from the video images of the participant that are obtained by the photographing unit 1001.

In this case, the first sending unit 1002 is further configured to send the positive or approximately positive video images of the participant that are obtained by the processing unit 1003 to the video communication remote end.

Figure 12:
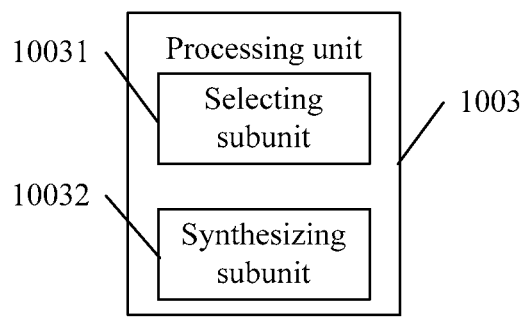
FIG. 12 is a schematic structural diagram of a processing unit in the video communication apparatus shown in FIG. 11 according to an embodiment of the present invention.

As shown in FIG. 12, in this embodiment, the processing unit 1003 may include a selecting subunit 10031 and/or a synthesizing subunit 10032.

The selecting subunit 10031 is configured to use a face detection technology to select the positive or approximately positive video images from the video images of the participant that are obtained by the photographing unit 1001.

Specifically, the selecting subunit 10031 may detect the positions such as the face range, eyes, nose, and mouth of the participant in the video images in each viewing angle that are obtained by the photographing unit 1001, then determine the angle of deflection of the video images in each viewing angle relative to a positive image according to the degree of symmetry of the eyes and face range relative to the nose and mouth, and finally select the positive or approximately positive video images of the participant from the video images in each viewing angle according to the angle of deflection.

The synthesizing subunit 10032 is configured to synthesize the positive or approximately positive video images according to the video images of the participant that are obtained by the photographing unit 1001.

Specifically, the synthesizing subunit 10032 may obtain information about disparity between video images according to the video images of the participant in each viewing angle that are obtained by the photographing unit 1001, and then use a virtual viewpoint synthesis algorithm to synthesize the positive or approximately positive video images of the participant according to the disparity information and the video images of the participant that are obtained by the photographing unit 1001.

The basic steps of virtual viewpoint synthesis may include: disparity mapping, based on which the images of virtual viewpoint positions are generated (mapping between integral disparity and fractional disparity); shadow or hole processing, which may process a shadow area according to a certain rule, and fill a hole caused by an area of discontinuous depth, for example, fill a small hole by linear or quadratic interpolation, and fill a big hole by using an image obtained from another viewing angle or by using a background; post-processing, which filters reconstructed images to improve the subjective effect.

In the disparity mapping, the disparity relationship between the middle viewpoint and the left viewpoint or the disparity relationship between the middle viewpoint and the right viewpoint is as follows:

$$d_{LR} = X_R - X_L = -\frac{BF}{z}$$

$$d_{Li} = X_i - X_L = -\frac{xF}{z} = \left(\frac{x}{B}\right)d_{LR} = \alpha d_{LR}$$

$$X_i = (1-\alpha)X_L + \alpha X_R = X_L + \alpha d_{LR}$$

where, $X_L$ and $X_R$ are respectively the positions of a point in the space in the X direction for imaging on the left and right images, and $X_i$ is a position of a middle virtual viewpoint in the X direction for imaging; B is the optical center distance of a camera, F is the focal distance of the camera, and z is the distance from the point to the imaging plane; $d_{LR}$ is the disparity between the left image and the right image, and α is a weight related to the distance between the optical center of a virtual camera and the optical center of the left camera or the distance between the optical center of a virtual camera and the optical of the right camera.

The color of a middle viewpoint image is usually determined according to the corresponding points in the left and right viewpoint images:

$$I_i(X_i,Y)=(1-\alpha)I_L(X_L,Y)+\alpha I_R(X_R,Y)$$

where, $I_L(X_L,Y)$ and $I_R(X_R,Y)$ are respectively the pixel color values of a point for imaging on the left and right images, and $I_i(X,Y)$ is a pixel color value of the middle virtual viewpoint for imaging.

Further, as shown in FIG. 11, the video communication apparatus provided by the embodiment of the present invention may include:

a second sending unit 1004, configured to send indication information to the video communication remote end, where the indication information is used to instruct the video communication remote end to obtain the positive or approximately positive video images of the participant.

In this embodiment, the indication information may be angle information required for synthesizing the positive or approximately positive video images of the participant, or be the error range information of the approximately positive video images, which is not described here.

The video communication apparatus provided by the embodiment of the present invention may obtain the video images of a participant from more than two different horizontal shooting angles, and send the video images to a video communication remote end, so that the video communication remote end may display the positive video images according to the video images, which thereby reaches the eye-to-eye video communication effect in the horizontal direction, and solves the problem that the eye-to-eye video communication effect in the horizontal direction cannot be reached in the prior art.

Figure 13:
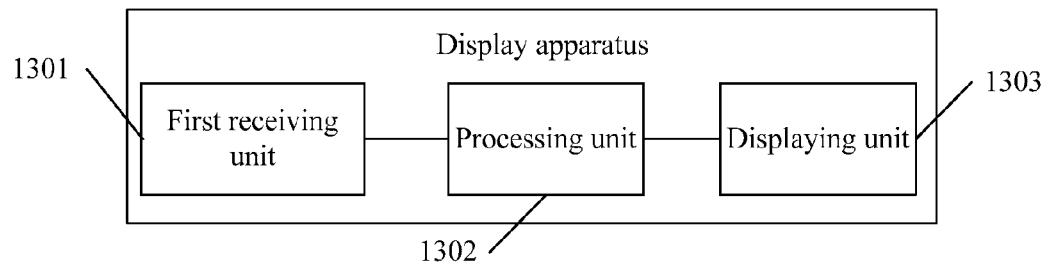
FIG. 13 is a first schematic structural diagram of a display apparatus according to an embodiment of the present invention.

As shown in FIG. 13, an embodiment of the present invention further provides a display apparatus, including:

a first receiving unit 1301, configured to receive video images of a participant from a video communication remote end, where the video images are obtained by using more than two different horizontal shooting angles;

a processing unit 1302, configured to obtain positive or approximately positive video images of the participant from the video images of the participant that are obtained by using the more than two different horizontal shooting angles and are received by the first receiving unit 1301; and a displaying unit 1303, configured to display the positive or approximately positive video images obtained by the processing unit 1302.

Further, in this embodiment, the processing unit 1302 may include a selecting subunit and/or a synthesizing subunit.

The selecting subunit is configured to use a face detection technology to select the positive or approximately positive video images from the video images of the participant that are received by the first receiving unit 1301.

Specifically, the selecting subunit may detect the positions such as the face range, eyes, nose, and mouth of the participant in the video images in each viewing angle that are received by the first receiving unit 1301, then determine the angle of deflection of the video images in each viewing angle relative to a positive image according to the degree of symmetry of the eyes and face range relative to the nose and mouth, and finally select the positive or approximately positive video images of the participant from the video images in each viewing angle according to the angle of deflection.

The synthesizing subunit is configured to synthesize the positive or approximately positive video images according to the video images of the participant that are received by the first receiving unit 1301.

Specifically, the synthesizing subunit may obtain information about disparity between video images according to the video images of the participant in each viewing angle that are received by the first receiving unit 1301, and then use a virtual viewpoint synthesis algorithm to synthesize the positive or approximately positive video images of the participant according to the disparity information and the video images of the participant that are received by the first receiving unit 1301.

Figure 14:
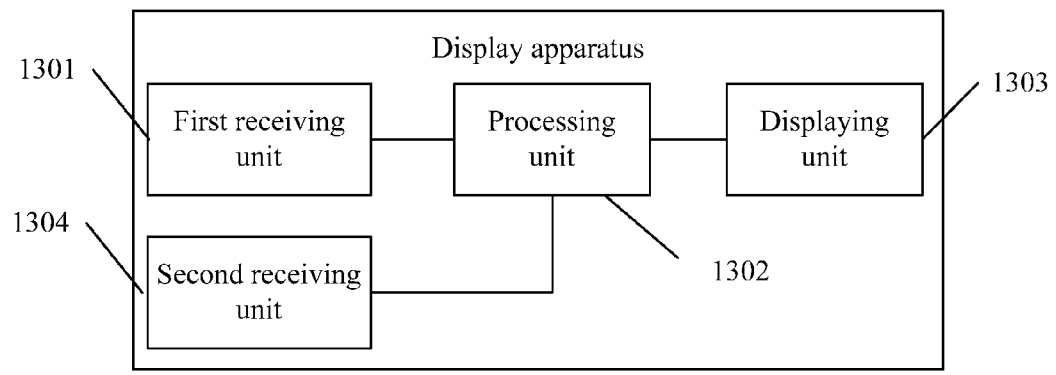
FIG. 14 is a second schematic structural diagram of a display apparatus according to an embodiment of the present invention.

Further, as shown in FIG. 14, the display apparatus provided by the embodiment of the present invention may include:

a second receiving unit 1304, configured to receive indication information from the video communication remote end.

The processing unit 1302 is further configured to obtain, according to the indication information received by the second receiving unit 1304, the positive or approximately positive video images of the participant from the video images of the participant that are obtained by using the more than two different horizontal shooting angles and are received by the first receiving unit 1301.

Further, in this embodiment, the displaying unit 1303 may be an ordinary display (a single-view display) or a multi-view display. When the video images received by the first receiving unit 1301 include the positive or approximately positive video images of the participant, the displaying unit 1303 may display all the video images received by the first receiving unit 1301 through a multi-view display, as shown in FIG. 14.

The display apparatus provided by the embodiment of the present invention may receive the video images of a participant from a video communication remote end, where the video images are obtained by using more than two different horizontal shooting angles, obtain positive or approximately positive video images from the video images, and display the positive or approximately positive video images, which thereby reaches the eye-to-eye video communication effect in the horizontal direction, and solves the problem that the eye-to-eye video communication effect in the horizontal direction cannot be reached in the prior art.

Figure 15:
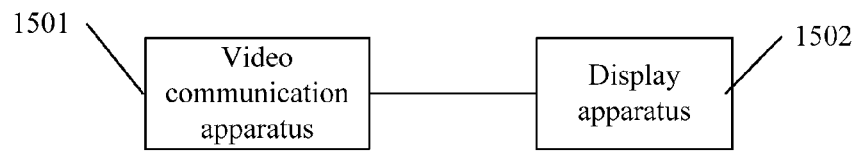
FIG. 15 is a schematic structural diagram of a video communication system according to an embodiment of the present invention.

As shown in FIG. 15, an embodiment of the present invention provides a video communication system, including a video communication apparatus 1501 and a display apparatus 1502.

The video communication apparatus 1501 is configured to: obtain video images of a participant through more than two cameras located in different horizontal shooting angles, obtain positive or approximately positive video images of the participant from the video images, and send the positive or approximately positive video images of the participant to the display apparatus 1502, where the range of viewing angles of the participant is between the more than two different horizontal shooting angles.

In this embodiment, the number and positions of cameras may be decided according to the number and directions of the viewing angles of the participants. When there are more than two participants in the conference party, the cameras may be single-lens wide-angle cameras, or may be multi-lens cameras with more than two lenses, where each lens of the multi-lens cameras may shoot one or multiple participants.

In this embodiment, the video communication apparatus 1501 may obtain the positive or approximately positive video images of the participant by using two methods.

One method is to use a face detection technology to select the positive or approximately positive video images of the participant from obtained video images of the participant. Specifically, the method may include: detecting the positions such as the face range, eyes, nose, and mouth of the participant in the video images obtained in each viewing angle; then determining the angle of deflection of the video images in each viewing angle relative to a positive image according to the degree of symmetry of the eyes and face range relative to the nose and mouth; and finally selecting the positive or approximately positive video images of the participant from the video images in each viewing angle according to the angle of deflection.

The other method is to synthesize the positive or approximately positive video images according to the obtained video images of the participant. Specifically, the method may include: obtaining information about disparity between video images according to the obtained video images of the participant in each viewing angle; then using a virtual viewpoint synthesis algorithm to synthesize the positive or approximately positive video images of the participant according to the disparity information and the obtained video images of the participant.

The basic steps of virtual viewpoint synthesis may include: disparity mapping, based on which the images of virtual viewpoint positions are generated (mapping between integral disparity and fractional disparity); shadow or hole processing, which may process a shadow area according to a certain rule, and fill a hole caused by an area of discontinuous depth, for example, fill a small hole by linear or quadratic interpolation, and fill a big hole by using an image obtained from another viewing angle or by using a background; post-processing, which filters reconstructed images to improve the subjective effect.

In the disparity mapping, the disparity relationship between the middle viewpoint and the left viewpoint or the disparity relationship between the middle viewpoint and the right viewpoint is as follows:

$$d_{LR} = X_R - X_L = -\frac{BF}{z}$$
$$d_{Li} = X_i - X_L = -\frac{xF}{z} = \left(\frac{x}{B}\right)d_{LR} = \alpha d_{LR}$$
$$X_i = (1-\alpha)X_L + \alpha X_R = X_L + \alpha d_{LR}$$

where, $X_L$ and $X_R$ are respectively the positions of a point in the space in the X direction for imaging on the left and right images, and $X_i$ is a position of a middle virtual viewpoint in the X direction for imaging; B is the optical center distance of a camera, F is the focal distance of the camera, and z is the distance from the point to the imaging plane; $d_{LR}$ is the disparity between the left image and the right image, and α is a weight related to the distance between the optical center of a virtual camera and the optical center of the left camera or the distance between the optical center of a virtual camera and the optical center of the right camera.

The color of a middle viewpoint image is usually determined according to the corresponding points in the left and right viewpoint images:

$$I_i(X_i,Y)=(1-\alpha)I_L(X_L,Y)+\alpha I_R(X_R,Y)$$

where, $I_L(X_L, Y)$ and $I_R(X_R,Y)$ are respectively the pixel color values of a point for imaging on the left and right images, and $I_i(X_i,Y)$ is a pixel color value of the middle virtual viewpoint for imaging.

In a practical application process, the positive or approximately positive video images of the participant may be obtained by using other methods, which are not described here.

The display apparatus 1502 is configured to receive and display the positive or approximately positive video images of the participant that are sent by the video communication apparatus 1501.

In the video communication system provided by the embodiment of the present invention, the video communication apparatus may obtain video images of a participant from more than two different horizontal shooting angles, select positive or approximately positive video images of the participant from the video images, and send the positive or approximately positive video images of the participant to the display apparatus for displaying, which thereby reaches the eye-to-eye video communication effect in the horizontal direction, and solves the problem that the eye-to-eye video communication effect in the horizontal direction cannot be reached in the prior art.

Another embodiment of the present invention provides a video communication system, including:

a video communication apparatus, configured to: obtain video images of a participant through more than two cameras located in different horizontal shooting angles, and send the video images of the participant to a display apparatus, where the range of viewing angles of the participant is between the more than two different horizontal shooting angles; and the display apparatus, configured to: receive the video images of the participant that are sent by the video communication apparatus, obtain positive or approximately positive video images of the participant from the video images of the participant, and display the positive or approximately positive video images of the participant.

Further, the video communication apparatus is configured to send indication information to the display apparatus; and the display apparatus is configured to receive the indication information sent by the video communication apparatus, and obtain the positive or approximately positive video images of the participant from the video images of the participant according to the indication information.

In this embodiment, the display apparatus may be an ordinary display (a single-view display) or a multi-view display; when the display apparatus is a multi-view display and the received video images include the positive or approximately positive video images of the participant, the multi-view display may display all the received video images.

In the video communication system provided by the embodiment of the present invention, the video communication apparatus may obtain video images of a participant from more than two different horizontal shooting angles, and send the video images to the display apparatus at the video communication remote end, so that the display apparatus at the video communication remote end may display positive or approximately positive video images according to the video images, which thereby reaches the eye-to-eye video communication effect in the horizontal direction, and solves the problem that the eye-to-eye video communication effect in the horizontal direction cannot be reached in the prior art.

It is understandable to persons skilled in the art that all or part of the steps of the method embodiments may be implemented by hardware following the instructions of a program. The program may be stored in a computer readable storage medium. When the program runs, the processes of the above method embodiments may be included. The storage medium may be a read only memory (ROM), a random access memory (RAM), a magnetic disk or a compact disk-read only memory (CD-ROM).

The above are exemplary embodiments of the present invention, but the protection scope of the present invention is not limited to the embodiments. Any modification or substitution readily conceivable by those skilled in the art within the scope of the technology disclosed in the present invention shall fall within the protection scope of the present invention. Therefore, the protection scope of the present invention is subject to the appended claims.

What is claimed is:

1. A video communication method, comprising:
    obtaining video images of a participant from more than two different horizontal shooting angles, wherein a range of viewing angles of the participant is between the more than two different horizontal shooting angles;
    obtaining positive or approximately positive video images of the participant from the video images of the participant wherein the obtaining the positive or approximately positive video images of the participant comprises:
        detecting positions of facial features of the participant in the video images in each shooting angle,
        determining an angle of deflection of the video images in each shooting angle based on a degree of symmetry of the facial features of the participant in the video images in each shooting angle, and
        selecting the positive or approximately positive video images based on the angle of deflection of the video images in each shooting angle; and
    sending the positive or approximately positive video images of the participant to a video communication remote end.

2. The method according to claim 1, wherein the obtaining positive or approximately positive video images of the participant from the video images of the participant that are obtained by using the more than two different horizontal shooting angles further comprises:
    synthesizing the positive or approximately positive video images according to the video images of the participant that are obtained by using the more than two different horizontal shooting angles.

3. A video communication method, comprising:
    receiving video images of a participant from a video communication remote end, wherein the video images are obtained by using more than two different horizontal shooting angles;
    obtaining positive or approximately positive video images of the participant from the video images of the participant that are obtained by using the more than two different horizontal shooting angles, wherein the obtaining the positive or approximately positive video images of the participant comprises:
        detecting positions of facial features of the participant in the video images in each shooting angle,
        determining an angle of deflection of the video images in each shooting angle based on a degree of symmetry of the facial features of the participant in the video images in each shooting angle, and
        selecting the positive or approximately positive video images based on the angle of deflection of the video images in each shooting angle; and
    displaying the positive or approximately positive video images.

4. The method according to claim 3, wherein the obtaining positive or approximately positive video images of the participant from the video images of the participant that are obtained by using the more than two different horizontal shooting angles further comprises:
    synthesizing the positive or approximately positive video images according to the video images of the participant that are obtained by using the more than two different horizontal shooting angles.

5. The method according to claim 3, wherein the method further comprises:
    receiving indication information from the video communication remote end, wherein the obtaining positive or approximately positive video images of the participant from the video images of the participant is based on the indication information.

6. A video communication apparatus, comprising:
    a photographing unit, configured to obtain video images of a participant from more than two different horizontal shooting angles, wherein a range of viewing angles of the participant is between the more than two different horizontal shooting angles;
    a processing unit, configured to obtain positive or approximately positive video images of the participant wherein the obtaining the positive or approximately positive video images of the participant comprises:
        detecting positions of facial features of the participant in the video images in each shooting angle,
        determining an angle of deflection of the video images in each shooting angle based on a degree of symmetry of the facial features of the participant in the video images in each shooting angle, and
        selecting the positive or approximately positive video images based on the angle of deflection of the video images in each shooting angle; and
    a sending unit, configured to send the positive or approximately positive video images of the participant to a video communication remote end.

7. The apparatus according to claim 6, wherein the processing unit comprises at least one of:
    a selecting subunit, configured to use face detection to select the positive or approximately positive video images from the video images of the participant that are obtained by the photographing unit; and
    a synthesizing subunit, configured to synthesize the positive or approximately positive video images according to the video images of the participant that are obtained by the photographing unit.

8. A display apparatus, comprising:
    a receiving unit, configured to receive video images of a participant from a video communication remote end, wherein the video images are obtained by using more than two different horizontal shooting angles;
    a processing unit, configured to obtain positive or approximately positive video images of the participant from the video images of the participant that are obtained by using the more than two different horizontal shooting angles and received by the first receiving unit, wherein the obtaining the positive or approximately positive video images of the participant comprises:
        detecting positions of facial features of the participant in the video images in each shooting angle, determining an angle of deflection of the video images in each shooting angle based on a degree of symmetry of the facial features of the participant in the video images in each shooting angle, and selecting the positive or approximately positive video images based on the angle of deflection of the video images in each shooting angle; and a displaying unit, configured to display the positive or approximately positive video images obtained by the processing unit.

9. The apparatus according to claim 8, wherein the processing unit comprises at least one of:

a selecting subunit, configured to use face detection to select the positive or approximately positive video images from the video images of the participant that are received by the first receiving unit; and a synthesizing subunit, configured to synthesize the positive or approximately positive video images according to the video images of the participant that are received by the first receiving unit.

10. The apparatus according to claim 8, further comprising:

a second receiving unit, configured to receive indication information from the video communication remote end;

wherein the processing unit is configured to obtain the positive or approximately positive video images of the participant from the video images of the participant according to the indication information.

11. A video communication system, comprising:

a video communication apparatus, configured to:

obtain video images of a participant through more than two cameras located in different horizontal shooting angles, obtain positive or approximately positive video images of the participant from the video images, wherein the obtaining the positive or approximately positive video images of the participant comprises:

detecting positions of facial features of the participant in the video images in each shooting angle, determining an angle of deflection of the video images in each shooting angle based on a degree of symmetry of the facial features of the participant in the video images in each shooting angle, and selecting the positive or approximately positive video images based on the angle of deflection of the video images in each shooting angle, and send the positive or approximately positive video images of the participant to a display apparatus, wherein a range of viewing angles of the participant is between the more than two different horizontal shooting angles; and the display apparatus, configured to receive and display the positive or approximately positive video images of the participant that are sent by the video communication apparatus.

12. A video communication system, comprising:

a video communication apparatus, configured to: obtain video images of a participant through more than two cameras located in different horizontal shooting angles, and send the video images of the participant to a display apparatus, wherein a range of viewing angles of the participant is between the more than two different horizontal shooting angles; and the display apparatus, configured to: receive the video images of the participant that are sent by the video communication apparatus, obtain positive or approximately positive video images of the participant from the video images of the participant, and display the positive or approximately positive video images of the participant, wherein obtaining, by the display apparatus, the positive or approximately positive video images of the participant from the video images of the participant comprises:

detecting positions of facial features of the participant in the video images in each shooting angle determining an angle of deflection of the video images in each shooting angle based on a degree of symmetry of the facial features of the participant in the video images in each shooting angle, and selecting the positive or approximately positive video images based on the angle of deflection of the video images in each shooting angle.

13. The system according to claim 12, wherein:

the video communication apparatus is further configured to send indication information to the display apparatus; and the display apparatus is further configured to receive the indication information sent by the video communication apparatus, and to obtain the positive or approximately positive video images of the participant from the video images of the participant according to the indication information.

14. The method according to claim 1, wherein the facial features include eyes, a face range, a nose, and a mouth of the participant, and wherein, for each shooting angle, the degree of symmetry of the facial features of the participant in the video images is based on a symmetry of the eyes and the face range of the participant relative to the nose and the mouth of the participant.

15. The method according to claim 3, wherein the facial features include eyes, a face range, a nose, and a mouth of the participant, and wherein, for each shooting angle, the degree of symmetry of the facial features of the participant in the video images is based on a symmetry of the eyes and the face range of the participant relative to the nose and the mouth of the participant.

16. The apparatus according to claim 6, wherein the facial features include eyes, a face range, a nose, and a mouth of the participant, and wherein, for each shooting angle, the degree of symmetry of the facial features of the participant in the video images is based on a symmetry of the eyes and the face range of the participant relative to the nose and the mouth of the participant.

17. The apparatus according to claim 8, wherein the facial features include eyes, a face range, a nose, and a mouth of the participant, and wherein, for each shooting angle, the degree of symmetry of the facial features of the participant in the video images is based on a symmetry of the eyes and the face range of the participant relative to the nose and the mouth of the participant.

18. The system according to claim 11, wherein the facial features include eyes, a face range, a nose, and a mouth of the participant, and wherein, for each shooting angle, the degree of symmetry of the facial features of the participant in the video images is based on a symmetry of the eyes and the face range of the participant relative to the nose and the mouth of the participant.

19. The system according to claim 12, wherein the facial features include eyes, a face range, a nose, and a mouth of the participant, and wherein, for each shooting angle, the degree of symmetry of the facial features of the participant in the video images is based on a symmetry of the eyes and the face range of the participant relative to the nose and the mouth of the participant.

* * * * *